Sept. 20, 1938.  J. L. ANDERSON  2,130,374
TEMPLATE FOLLOWER
Filed July 28, 1937
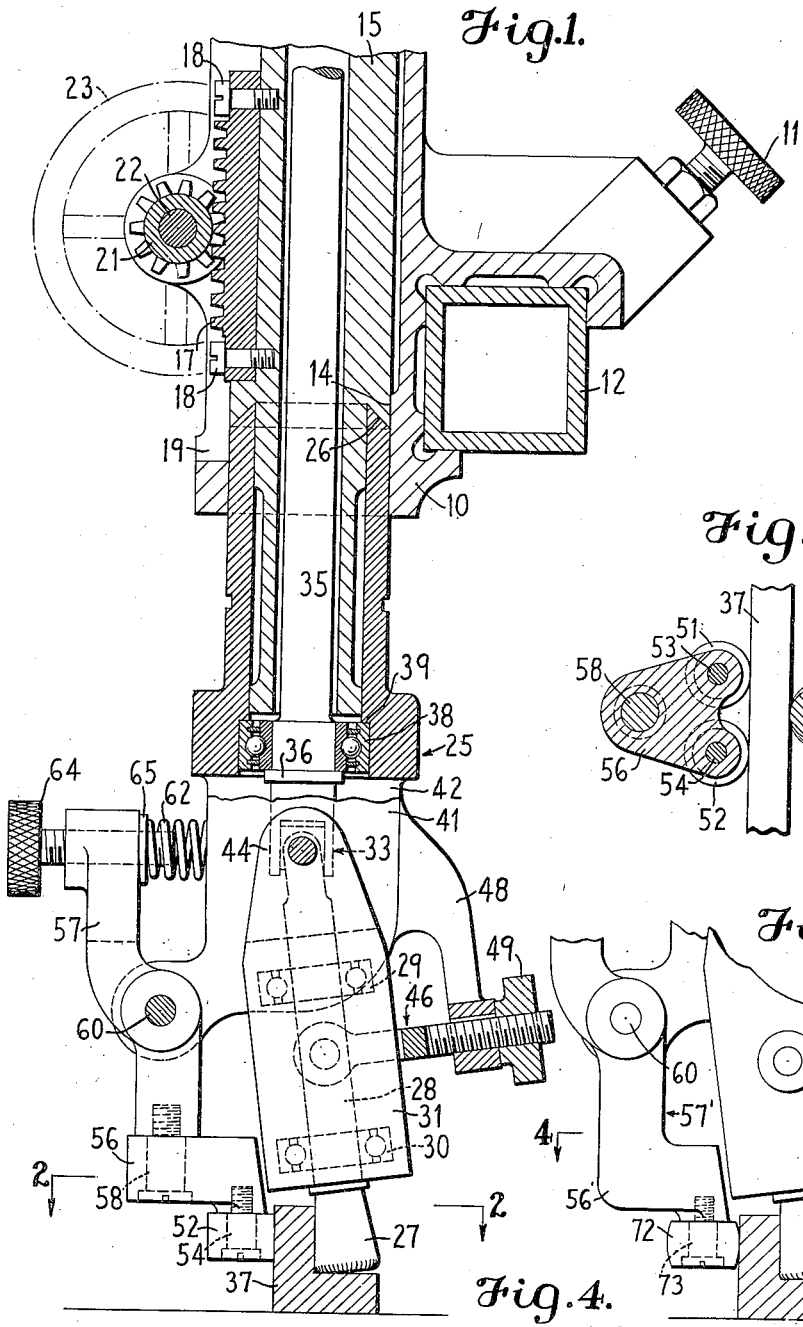
Fig. 1.
Fig. 2.
Fig. 3.
Fig. 4.
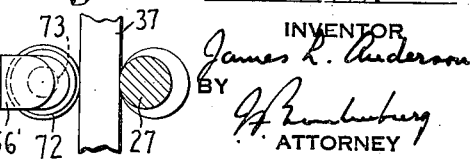
INVENTOR
James L. Anderson
BY
ATTORNEY Patented Sept. 20, 1938

2,130,374

UNITED STATES PATENT OFFICE 2,130,374

TEMPLATE FOLLOWER

James L. Anderson, Closter, N. J., assignor to Air Reduction Company, Incorporated, New York, N. Y., a corporation of New York Application July 28, 1937, Serial No. 156,115

11 Claims. (Cl. 33—25)

This invention relates to power-driven template-followers that automatically follow along the outline of straight or irregularly curved templates at substantially uniform speed. Such devices are used for moving the torch-supporting frames of universal cutting and welding machines, the connections being such that movement of the template-follower produces corresponding movement of the torch, but template-followers can be employed for other purposes.

It is an object of this invention to provide an improved template-follower which is of very simple construction, operates with inexpensive templates, maintains substantially uniform speed around both inside and outside curves, and is capable of negotiating relatively sharp turns.

The template-follower of this invention has a power-driven roller which cooperates with a template having a dihedral angle, preferably a right angle, the upstanding side of which forms the guiding edge of the template and the lower side of which provides the supporting surface for the template-follower. The axis of rotation of the roller is inclined so that the roller tends to roll toward the upstanding side of the template and therefore hugs the guiding edge of the template along straight runs or around curves in either direction.

Other objects, features and advantages of the invention will appear or be pointed out as the specification proceeds.

In the accompanying drawing, forming part hereof:

Fig. 1 is a vertical sectional view of the lower portion of a template-follower embodying this invention.

Fig. 2 is a horizontal sectional view taken on the line 2—2 of Fig. 1.

Fig. 3 is a fragmentary view showing a modified form of the invention.

Fig. 4 is a sectional view taken on the line 4—4 of Fig. 3.

The template-follower includes a bracket 10 having a screw 11 with which it is clamped to a bar 12. This bar is representative of the torch-supporting frame or its connections by which a cutting or welding torch is caused to move in any and changing directions in a plane along a path corresponding to the path traveled by the template-follower.

There is a vertical tubular bearing 14 in the bracket 10. A sleeve 15 extends through this bearing and is free to slide axially in the bearing within a limited range, but is prevented from rotating by a rack 17 which is attached to the sleeve by screws 18. The rack 17 fits in a slot 19 in the bracket 10, and while the width of the slot exceeds that of the rack by only a reasonable clearance, the length of the slot 19 is considerably longer than the rack so as not to interfere with a limited up and down movement of the sleeve.

The sleeve 15 moves up and down with a "floating" action in response to any unevenness of the template surface along which the template-follower operates. This action keeps the pressure of the template-follower on the template more uniform. Manually operated means are provided for lowering and raising the template-follower into and out of contact with a template. This means includes a pinion 21, that meshes with the rack 17, and is secured to an axle 22 which can be rotated in either direction by a hand-wheel 23. The upper portion of the template-follower is not shown in the drawing since it is similar to known tracers, such as shown in Patent Nos. 2,059,755 and 1,999,855, and a description of it is not necessary for a complete understanding of this invention.

The sleeve 15 has a lower end portion of reduced diameter which provides a bearing for a frame 25. A sloping annular face at the upper end of the frame 25 contacts with an undercut shoulder 26 on the sleeve 15. The outside of the upwardly extending end of the frame 25 forms a continuation of the outside surface of the sleeve 15 so that the upper end of the frame can slide into and out of the bearing 14.

The template-follower has a roller 27 connected to the lower end of an axle 28 which turns in anti-friction bearings 29, 30 held in a bearing support 31. The upper end of the axle 28 is connected by a universal joint 33 to the lower end of a drive shaft 35.

A collar 36 on the drive shaft 35 holds the frame 25 and sleeve 15 in assembled relation. The collar 36 thrusts against a ball bearing 38 in which the shaft 35 turns, and this ball bearing thrusts against a shoulder 39 in the frame 25 and keeps the upper end of the frame in contact, or substantially so, with the undercut shoulder 26 of the sleeve.

The lower portion of the frame 25 is bifurcated, the two downwardly extending parts being indicated by the reference characters 41, 42 and the forward part 41 being broken away in the drawing to expose the structure between the bifurcations. The bearing support 31 is connected with the frame 25 by lugs 44 which extend from the opposite sides of the bearing support 31 into bearings in the downwardly extending parts 41, 42 of the frame 25. The axes of the lugs 44 are preferably in line with the point of intersection of the axes of the universal joint so that the bearing support 31 can be moved about the lugs 44 to change the angle of inclination of the axle 28.

The bearing support 31 is held at the desired inclination by a yoke 46, which has its forked end fastened to opposite sides of the bearing support 31 and its other end extending through a bracket 48 of the frame 25 and threaded to receive a nut 49.

The axis of rotation of the frame 25 about the sleeve 15 is coincident with the axis of the drive shaft 35, and the nut 49 is ordinarily adjusted so that this line when extended will pass through the upstanding portion of the template 37 some distance in from the guiding surface with which the roller 27 contacts. The path followed by the axis of rotation of the frame 25 is the path followed by the torch with most universal cutting machine linkages.

The region at the bottom edge of the template-follower roller 27 is knurled to increase its friction against the horizontally extending surface of the template, and is slightly rounded as shown in the drawing in order to increase its area of contact with the horizontal portion of the template. With templates having no horizontal portion to serve as a supporting surface for the template-follower, the roller 27 may rest on the surface of the table or work by which the template is supported, such surface being the mechanical equivalent of the horizontal portion of the template shown in the drawing. The inclination of the roller 27 gives it a tendency to roll around the axis of the shaft 35 as a center, but as long as the frame 25 does not turn, the upstanding portion of the template prevents any relative movement of the roller 27 about that center and the roller therefore hugs the upstanding guiding portion of the template as it travels along the template.

The component of the tractive force which tends to move the roller 27 sideways and against the guiding surface of the template depends upon the inclination of the axle 28. Adjusting the nut 49 in a direction to increase the angle which the axle makes with the vertical increases the force holding the roller 27 against the template. Such an adjustment changes the relation between the template and the axis of rotation of the frame 25, and since the path of this axis is the path followed by the torch, the template must be designed for a definite inclination of the axle and roller 27.

The turning of the frame 25 is controlled, so as to keep the roller 27 in the desired relation to the template, by two wheels 51, 52 which rotate about substantially vertical axles 53, 54. Each of the axles 53, 54 has a threaded upper end connecting it with a support 56 swivelly fastened to the end of a lever 57 by a screw 58. The lever 57 rocks on a shaft 60 extending between the bifurcations of the frame 25.

A spring 62 presses against the upper end of the lever 57 and urges the swivel screw 58 closer to the roller 27 and holds the wheels 51, 52 against the template. The pressure of the spring 62 can be changed by means of an adjusting screw 64 which threads through the upper end of the lever 57 and has a collar 65 bearing against one end of the spring.

When the template-follower is operating along a straight run of template, as shown in Fig. 2, and the wheels 51, 52 are equal distances ahead of and behind a plane through the axes of the swivel screw 58 and the roller 27, then any rotation of the frame 25 will cause the swivel screw 58 to move further away from the roller 27, and such rotation is therefore opposed by the spring 62. On all curves the action of the spring 62 is to let the frame 25 turn only as far as necessary to maintain the swivel screw 58 and roller 27 in substantially centered positions with respect to the wheels 51, 52 as explained in connection with Fig. 2.

The wheels 51, 52 are close together so that the template-follower can travel around curves of relatively short radii. Even with the wheels 51, 52 close together, the difference between the course of the template and the chord through the points of contact of the wheels 51, 52 with the template makes it necessary for the wheels to move closer to or further from (depending upon the direction of the curve) the roller 27 in order that both the wheels and the traction roller may stay in contact with the upsanding portion of the template when traveling along parts of the template where there are changes in the radius of curvature. The movement of the lever 57 made possible by the yielding pressure of the spring 62 allows the wheels 51, 52 to move toward and from the traction roller in the manner necessary.

Figs. 3 and 4 show a modified form of the invention, in which there is a single roller 72 in place of the two rollers 51, 52 on the template-follower of Figs. 1 and 2.

The roller 72 turns on a substantially vertical axle 73, that threads into a support 56' which is an integral part of a lever 57'. The lever 57' rocks on the shaft 60 and is similar to the lever 57 of Fig. 1 except that the support 56' is an integral part of the lever 57' and shaped to hold only one roller.

The axis of the roller 72 is in the same plane with the axis of the roller 27 and the template-follower tends to assume a position which keeps that plane normal to the side walls of the template where the rollers contact with the template because in that position the rollers 72 and 27 are closest together and the spring at the upper end of the lever 57' under the least tension.

The invention is not limited to the embodiment illustrated and terms of orientation in the description and claims are relative. Various changes and modifications can be made and some features of the invention may be used without others.

I claim:

1. An automatic template-follower including a roller having a friction face which bears against a supporting surface and rotates about an axis which is inclined with respect to the supporting surface so that the friction between the roller and said surface urges the roller against the guiding edge of a template, an inclined axle connected with the roller, a drive shaft, and a universal joint connecting the axle with the drive shaft.

2. In a template-follower, a vertical drive shaft, an axle extending at an angle to the drive shaft, a universal joint connecting the drive shaft with the axle, and a template-follower roller on the end of the axle having a peripheral face for contact with an upstanding guiding edge of a template, and having a friction face in position to contact with a substantially horizontal supporting surface at a point out of line with the drive shaft.

3. A template-follower comprising a drive shaft, an axle, a universal joint connecting the drive shaft with the axle, bearings in which the axle turns, means for moving the bearings to dispose the axle at various angles to the drive shaft, and a roller on the axle having a peripheral surface which runs against an upstanding guiding edge of a template, and having a friction face which bears against a surface at an angle to its axis of rotation to generate a side thrust to cause the roller to hug the guiding edge of the template.

4. An automatic template-follower including a roller having a peripheral face for rolling along the guiding surface of a template and having a friction face for contact with an underlying supporting surface, an axle holding said roller at an inclination to the supporting surface so that rotation of the roller causes it to travel along the supporting surface with a tractive force having a component toward one side, means for rotating the roller, and means for adjusting the inclination of the axle to change the component of the tractive force urging the roller to one side.

5. In an automatic template-follower, a roller having a frustro-conical peripheral surface for rolling along the boundary of a template, and a friction face at the bottom of the roller for supporting the roller and driving the template-follower from a supporting surface at an acute angle to the axis of rotation of the roller.

6. A template-follower including a vertically movable frame, an inclined axle connected with the frame, a roller at the lower end of the axle with a peripheral face for contact with the guiding edge of a template and a friction face at the bottom of the roller for supporting the template-follower frame from a substantially horizontal surface, and power means for rotating the roller to cause it to travel along the template with a component of its tractive force urging it against the guiding edge of the template.

7. In an automatic template-follower, a roller having a friction face for contact with a supporting surface, an axle holding the roller with its axis of rotation at an acute angle to the supporting surface and sloping toward the template side of the roller so that the roller tends to travel in a circular path about a center on its template side, and control means for keeping said center on the template side of the roller as the template-follower moves along a curved template.

8. A template-follower comprising a frame rotatable about a substantially vertical axis, an axle in the frame, a template-follower roller on the axle, the roller and axle being disposed on an inclined axis so that the roller tends to travel in a circular path and rotate the frame about said vertical axis, and means controlling the turning of the frame in accordance with the shape of a template when the template-follower is in operation.

9. In apparatus of the class described, a template-follower roller for contact with the guiding edge of a template, an inclined axle for said roller, a frame supported by the roller from an underlying surface on which the bottom edge of the roller rests, said frame being rotatable about a vertical axis, and means connected with the frame and constructed and arranged to contact with the side of the template away from the roller to prevent the frame from turning except in accordance with curves in the template.

10. A template-follower comprising a frame, a bearing on which the frame turns about a vertical axis, an inclined axle supported by the frame, a roller at the lower end of the axle with a peripheral face for contact with the guiding edge of a template and a friction face at its bottom edge for supporting and driving the template-follower from an underlying supporting surface, said roller being so located that it contacts with the template at a point out of line with the axis of rotation of the frame, and means controlling the turning of the frame in a manner to keep said axis of rotation always on the template side of the roller, said means including two wheels contacting with the template at spaced points on the side of the template remote from the roller, and yielding means holding the wheels against the template.

11. An automatic template-follower including a roller disposed with its axis of rotation at an incline and having a peripheral face for contact with the guiding edge of a template and a friction face at its bottom edge for supporting and driving the template-follower from an underlying supporting surface, an axle for said roller, a frame supported by the axle and roller, a bearing on which the frame is rotatable about an axis that is on the side of the roller toward which the axis of the roller and axle slope, and means to control the turning of the frame to keep the center about which the frame turns always on the template side of the roller, said means including a swivel support carried by the frame, two wheels carried by said support in position to contact with the template on the side remote from the roller and at points ahead of and behind the plane defined by the axis of the roller and the swivel axis of said support, and a spring urging the support and wheels toward the template.

JAMES L. ANDERSON.